United States Patent
Turtinen et al.

(10) Patent No.: US 11,425,594 B2
(45) Date of Patent: Aug. 23, 2022

(54) QUALITY OF SERVICE FLOW RELOCATION

(71) Applicant: Nokia Technologies Oy, Espoo (FI)

(72) Inventors: Samuli Turtinen, Ii (FI); Benoist Sebire, Tokyo (JP); Matti Laitila, Oulu (FI); Guillaume Decarreau, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 139 days.

(21) Appl. No.: 16/488,413

(22) PCT Filed: Mar. 1, 2018

(86) PCT No.: PCT/FI2018/050148
§ 371 (c)(1),
(2) Date: Aug. 23, 2019

(87) PCT Pub. No.: WO2018/172602
PCT Pub. Date: Sep. 27, 2018

(65) Prior Publication Data
US 2020/0068427 A1 Feb. 27, 2020

Related U.S. Application Data

(60) Provisional application No. 62/475,531, filed on Mar. 23, 2017.

(51) Int. Cl.
*H04W 28/02* (2009.01)
*H04W 28/24* (2009.01)
(Continued)

(52) U.S. Cl.
CPC ......... *H04W 28/0268* (2013.01); *H04L 47/32* (2013.01); *H04W 28/0252* (2013.01);
(Continued)

(58) Field of Classification Search
CPC . H04W 28/0268; H04W 28/24; H04W 80/08; H04W 28/0278; H04W 28/06;
(Continued)

(56) References Cited

U.S. PATENT DOCUMENTS 8,023,454 B2* 9/2011 Yi .................. H04L 1/1848
370/328
10,924,970 B2* 2/2021 Meylan ............. H04L 1/1874
(Continued)

FOREIGN PATENT DOCUMENTS

EP  3355641 A1  8/2018
EP  3494756 A1  6/2019
(Continued)

OTHER PUBLICATIONS

Extended European Search Report received for corresponding European Patent Application No. 18772179.0, dated Dec. 10, 2020, 8 pages.
(Continued)

*Primary Examiner* — Nishant Divecha
(74) *Attorney, Agent, or Firm* — Squire Patton Boggs (US) LLP

(57) ABSTRACT

Various communication systems may benefit from improved quality of service flow. A method may include receiving an indication at a radio resource control entity or service data adaptation protocol layer entity in a radio protocol of a receiver from a transmitter. The indication can include instructions to relocate a quality of service flow from a source to a target data radio bearer. The method may also include starting a timer associated with the quality of service. In addition, the method may include buffering data packets received as part of the quality of service flow from the target data radio bearer during a duration of the timer. Further, the method may include allowing for the transmis- (Continued)

sion of the buffered data packets of the quality of service flow received from the target data radio bearer to an upper protocol layer after the duration of the timer has lapsed or stopped.

18 Claims, 3 Drawing Sheets

(51) Int. Cl.
    *H04W 80/08* (2009.01)
    *H04W 28/06* (2009.01)
    *H04L 47/32* (2022.01)
    *H04W 40/34* (2009.01)
(52) U.S. Cl.
    CPC ... *H04W 28/0263* (2013.01); *H04W 28/0278* (2013.01); *H04W 28/06* (2013.01); *H04W 28/24* (2013.01); *H04W 40/34* (2013.01); *H04W 80/08* (2013.01)
(58) Field of Classification Search
    CPC ............. H04W 28/0252; H04W 40/34; H04W 28/0263; H04L 47/32
    See application file for complete search history.

(56) References Cited

U.S. PATENT DOCUMENTS

| | | | |
|---|---|---|---|
| 2015/0094073 | A1 | 4/2015 | Peng |
| 2015/0180786 | A1* | 6/2015 | Chen ................... H04L 1/0026 370/235 |
| 2015/0245402 | A1 | 8/2015 | Mochizuki et al. |
| 2016/0044639 | A1* | 2/2016 | Yi ........................ H04L 47/624 370/329 |
| 2016/0338138 | A1 | 11/2016 | Pelletier et al. |
| 2017/0064707 | A1* | 3/2017 | Xiao ...................... H04L 47/19 |
| 2017/0118793 | A1* | 4/2017 | Liu ....................... H04W 76/16 |
| 2018/0213540 | A1* | 7/2018 | Chiu ....................... H04L 69/22 |
| 2018/0219789 | A1* | 8/2018 | Chaudhuri ............. H04L 47/32 |
| 2020/0305218 | A1* | 9/2020 | Zhu ....................... H04L 1/1614 |

FOREIGN PATENT DOCUMENTS

| | | |
|---|---|---|
| EP | 3579506 A1 | 12/2019 |
| WO | 2016/105568 A1 | 6/2016 |
| WO | 2018/030798 A1 | 2/2018 |

OTHER PUBLICATIONS

"Chairman Notes", 3GPP TSG-RAN WG2 Meeting #97, RAN2 Chairman (Intel), Feb. 13-17, 2017, pp. 1-101.
"QoS Flow to DRB Mapping", 3GPP TSG-RAN2 Meeting#97, R2-1701205, Agenda item: 10.2.1.3, Huawei, Feb. 13-17, 2017, 6 pages.
"TR 38.804 v0.7.0 on Study on New Radio Access Technology; Radio Interface Protocol Aspects", 3GPP TSG-RAN WG2#97, R2-1702375, Agenda : 10.1, NTT DOCOMO, Inc., Feb. 13-17, 2017, 54 pages.
"QoS Flow Relocation", 3GPP TSG-RAN WG2 Meeting #97, R2-1700814, Agenda : 10.3.1.1.2, Nokia, Feb. 13-17, 2017, 3 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.1.0, Dec. 2016, pp. 1-317.
"3rd Generation Partnership Project; Technical Specification Group Radio Access Network; Evolved Universal Terrestrial Radio Access (E-UTRA); Radio Link Control (RLC) protocol specification (Release 13)", 3GPP TS 36.322, V13.2.0, Jun. 2016, pp. 1-45.
"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323, V14.1.0, Dec. 2016, pp. 1-39.
"Service Continuity", KT 5G SIG Interworking Teleconference #3, Agenda : 3, Nokia Networks, 4 pages.
"KT 5G Trial SIG Lossless Handover", Ericsson, Apr. 4, 2016, 8 pages.
"Lossless Switching", Samsung Electronics, Mar. 2016, 4 pages.
"3rd Generation Partnership Project; Technical Specification Group Radio Access Network; Study on New Radio Access Technology; Radio Interface Protocol Aspects (Release 14)", 3GPP TR 38.804, V1.0.0, Mar. 2017, pp. 1-56.
International Search Report and Written Opinion received for corresponding Patent Cooperation Treaty Application No. PCT/FI2018/050148, dated May 24, 2018, 17 pages.
"Radio Bearers and Per-Flow QoS for New Radio Access", 3GPP TSG-RAN WG2 #94, R2-164089, Agenda : 9.4.2, InterDigital Communications, May 23-27, 2016, 5 pages.
European Communication pursuant to Article 94(3) EPC, corresponding to EP Application No. 18 772 179.0, dated Jun. 28, 2022.

\* cited by examiner

QUALITY OF SERVICE FLOW RELOCATION

RELATED APPLICATION

This application was originally filed as PCT Application No. PCT/FI2018/050148 on Mar. 1, 2018, which claims priority to U.S. Provisional Patent Application No. 62/475,531 filed on Mar. 23, 2017.

BACKGROUND

Field

Various communication systems may benefit from improved quality of service flow. For example, it may be helpful to improve packet handling after a quality of service flow remapping to a new data radio bearer.

Description of the Related Art

Radio protocols for a user plane in third generation partnership project (3GPP) long term evolution (LTE) or LTE-advanced (LTE-A) technology include at least three different layers. The three layers are a Packet Data Convergence Protocol (PDCP), which is considered an upper layer, a Radio Link Control (RLC) layer, and a Medium Access Control (MAC) layer, which is considered a lower layer. The functions of the RLC layer are performed by RLC entities. For each RLC entity configured at a network entity, such as an enhanced NodeB (eNB), there is a corresponding RLC entity configured at a user equipment.

The RLC entity can either be a receiving or a transmitting entity, and can operate in a transparent mode (TM), an unacknowledged mode (UM), or an acknowledgement mode (AM). Depending on the mode of operation, the RLC entity can control the usage of error correction, concatenation, segmentation, re-segmentation, duplicate detection, and in-sequence delivery of service data units. While an RLC entity in an AM mode provides for reliable transmissions by offering error correction and retransmission, an RLC entity in a UM mode does not provide the same level of reliability.

In New Radio (NR) technology, a new radio protocol layer known as a New access stratum (AS) sublayer, also known as a Service Data Adaptation Protocol (SDAP) layer, has been added as an additional upper layer. The New AS layer helps in the mapping or the remapping of a quality of service flow to a data radio bearer. In a non-handover scenario, the quality of service flow remapping to a new data radio bearer can occur frequently, which forces the RLC entities to adjust to the new radio bearer.

SUMMARY

According to certain embodiments, an apparatus may include at least one memory including computer program code, and at least one processor. The at least one memory and the computer program code may be configured, with the at least one processor, to cause the apparatus at least to receive an indication at a radio resource control entity or service data adaptation protocol layer entity in a radio protocol of a receiver from a transmitter. The indication may comprise instructions to relocate a quality of service flow from a source data radio bearer to a target data radio bearer. The at least one memory and the computer program code may also be configured, with the at least one processor, to cause the apparatus at least to start a timer associated with the quality of service flow after receiving the indication. In addition, the at least one memory and the computer program code may be configured, with the at least one processor, to cause the apparatus at least to buffer data packets received as part of the quality of service flow from the target data radio bearer during a duration of the timer. In addition, the at least one memory and the computer program code may be configured, with the at least one processor, to cause the apparatus at least to allow for the transmission of the buffered data packets of the quality of service flow received from the target data radio bearer to an upper protocol layer after the duration of the timer has lapsed or stopped.

A method, in certain embodiments, may include receiving an indication at a radio resource control entity or service data adaptation protocol layer entity in a radio protocol of a receiver from a transmitter. The indication may comprise instructions to relocate a quality of service flow from a source data radio bearer to a target data radio bearer. The method may also include starting a timer associated with the quality of service flow after receiving the indication. In addition, the method may include buffering data packets received as part of the quality of service flow from the target data radio bearer during a duration of the timer. Further, the method may include allowing for the transmission of the buffered data packets of the quality of service flow received from the target data radio bearer to an upper protocol layer after the duration of the timer has lapsed or stopped.

An apparatus, in certain embodiments, may include means for receiving an indication at a radio resource control entity or service data adaptation protocol layer entity in a radio protocol of a receiver from a transmitter. The indication may comprise instructions to relocate a quality of service flow from a source data radio bearer to a target data radio bearer. The apparatus may also include means for starting a timer associated with the quality of service flow after receiving the indication. In addition, the apparatus may include means for buffering data packets received as part of the quality of service flow from the target data radio bearer during a duration of the timer. Further, the apparatus may include means for allowing for the transmission of the buffered data packets of the quality of service flow received from the target data radio bearer to an upper protocol layer after the duration of the timer has lapsed or stopped.

According to certain embodiments, a non-transitory computer-readable medium encoding instructions that, when executed in hardware, perform a process. The process may include receiving an indication at a radio resource control entity or service data adaptation protocol layer entity in a radio protocol of a receiver from a transmitter. The indication may comprise instructions to relocate a quality of service flow from a source data radio bearer to a target data radio bearer. The process may also include starting a timer associated with the quality of service flow after receiving the indication. In addition, the process may include buffering data packets received as part of the quality of service flow from the target data radio bearer during a duration of the timer. Further, the process may include allowing for the transmission of the buffered data packets of the quality of service flow received from the target data radio bearer to an upper protocol layer after the duration of the timer has lapsed or stopped.

According to certain other embodiments, a computer program product may encode instructions for performing a process. The process may include receiving an indication at a radio resource control entity or service data adaptation protocol layer entity in a radio protocol of a receiver from a transmitter. The indication may comprise instructions to relocate a quality of service flow from a source data radio bearer to a target data radio bearer. The process may also include starting a timer associated with the quality of service flow after receiving the indication. In addition, the process may include buffering data packets received as part of the quality of service flow from the target data radio bearer during a duration of the timer. Further, the process may include allowing for the transmission of the buffered data packets of the quality of service flow received from the target data radio bearer to an upper protocol layer after the duration of the timer has lapsed or stopped.

In a variant, wherein at least one of the source data radio bearer or the target data radio bearer may be associated with a radio link control entity located at a user plane.

In a further variant, the radio link control entity may be in an unacknowledged mode.

In a variant, the method may also include allowing for the transmission of data packets of the quality of service flow received from the source data radio bearer during the duration of the timer to the upper protocol layer.

In a further variant, the method may include discarding or triggering the discarding data packets of the quality of service flow received from the source data radio bearer after the duration of the timer has lapsed.

In a variant, the duration of the timer may be associated with the quality of service flow is determined by a service data adaptation protocol layer.

In yet another variant, the duration of the timer may depend in part on the capabilities of the receiver.

In an additional variant, the method may include allowing for transmission of data packets received of the quality of service flow received from the source data radio bearer after the duration of the timer has lapsed when no data packets of the quality of service flow have been received from the target data radio bearer during the duration of the timer. The transmission may be stopped when a first one of the data packets of the quality of service flow from the target data radio bearer is received.

In a further variant, the indication is received via radio resource control signaling.

In a variant, the method may include receiving a last data packet of the quality of service flow from the source data radio bearer. The last data packet comprises a last sequence number associated with the data packets of the quality of service flow received from the source data radio bearer. The method may also include stopping the timer associated with the quality of service flow when or after receiving the last data packet.

In another variant, the receiver may be a user equipment and the transmitter may be a network entity.

BRIEF DESCRIPTION OF THE DRAWINGS

For proper understanding of the invention, reference should be made to the accompanying drawings, wherein.

DETAILED DESCRIPTION

Certain embodiments allow for a SDAP layer to handle data packets received from the quality of service (QoS) flow after the remapping of the QoS flow from a source data radio bearer (S-DRB) to a target data radio bearer (T-DRB). In particular, an entity in the SDAP layer may utilize a timer in determining how to handle received QoS flow data packets. During the duration of the timer, the SDAP layer may allow the QoS flow data packets received from the S-DRB to be normally processed and forwarded to upper layers of the radio protocols of the user plane. Those QoS flow data packets received from the T-DRB during the duration of the timer, on the other hand, may be buffered. After the timer lapses or stops, the SDAP entity layer may allow for the processing and transmitting of the buffered QoS flow data packets received from the T-DRB to an upper layer.

Figure 1:
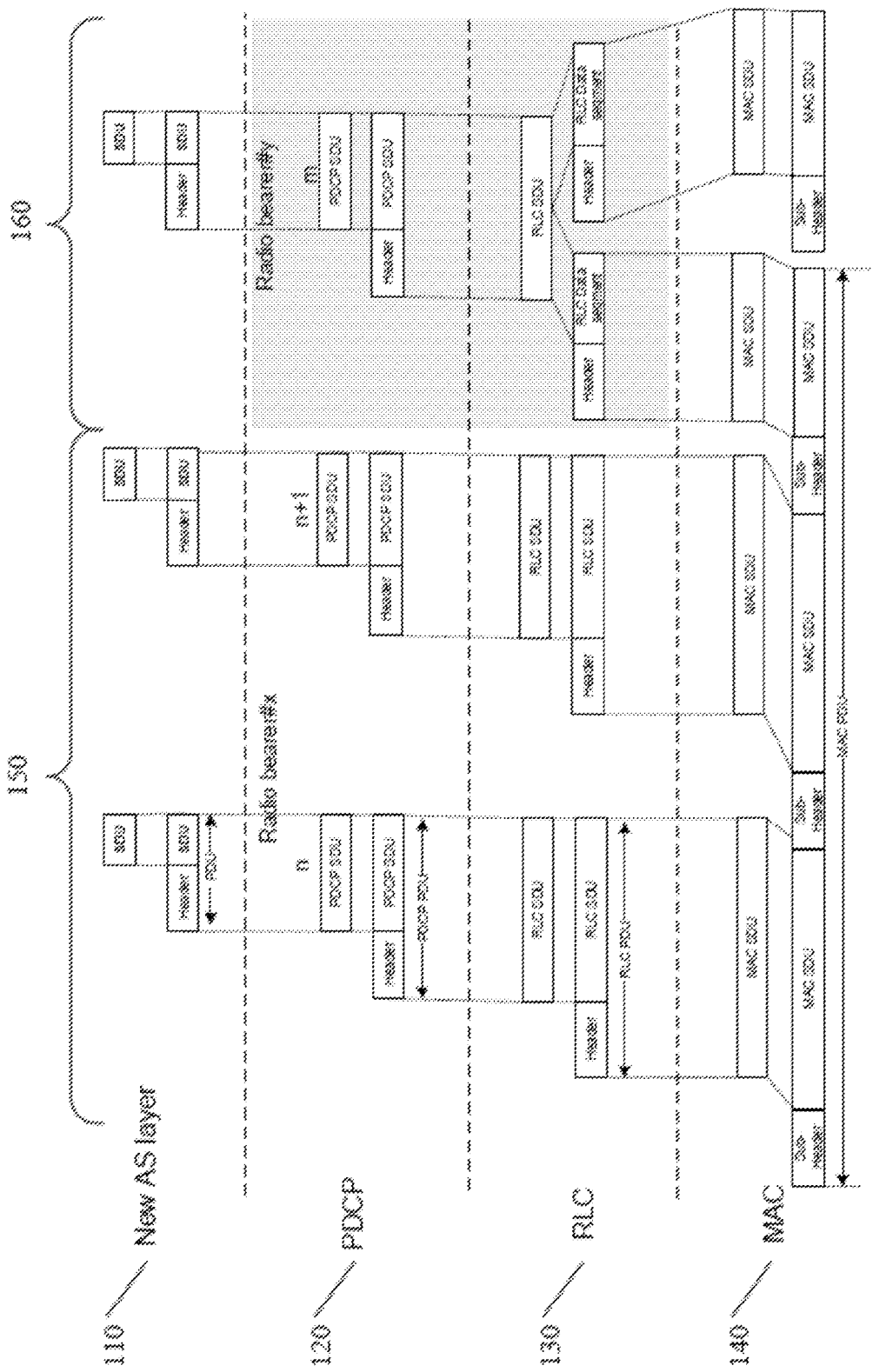
FIG. 1 illustrates an example of a new radio protocol layer architecture.

FIG. 1 illustrates an example of a NR protocol layer architecture. As discussed above, the NR radio protocols for the user plane include four different layers, SDAP layer 110, PDCP 120, RLC 130, and MAC 140. The NR protocol layer architecture may be used at a user equipment and/or any network entity, such as an eNB. The NR PDCP 120 may provide, for example, header compression and decompression, reordering, transfer of user data, ciphering and deciphering, and/or timer-based service data unit (SDU) discard. In certain embodiments that employ dual connectivity, the PDCP may also perform PDCP packet data unit (PDU) routing to associated links.

The layer below the PDCP may be a RLC sublayer 130. RLC sublayer 130 may, for example, transfer upper layer PDUs to lower layers or vice versa, and may reassemble RLC SDUs. Depending on the mode, the RLC entity may perform different functions. AM RLC entities, may provide for error correction through automatic repeat request, for example, and/or protocol error detection. AM RLC entities may also perform segmentation, re-segmentation, and/or duplicate detection. UM RLC entities may perform segmentation and/or duplicate detection. Any of the above functions may be considered part of the normal processing of data packets by the RLC entity. At least some of the above functions of both the PDCP and the RLC layers may depend on the sequence number in the header of every PDU in their respective layers. Such headers may be used to track and manage the data packets through the different layers of the radio protocol.

The lower layer of the radio protocol may be the MAC sublayer 140. Some of the functions of MAC sublayer 140 may include, for example, mapping between logical channels and transport channels, multiplexing and/or demultiplexing of MAC SDUs belonging to one or different logical channels into or from transport blocks (TB) derived to or from the physical layer and transport channels. When located in a UE, the MAC layer may receive downlink TBs that originate at the network entity, while the MAC layer located at the network entity may receive uplink TBs from the user equipment. MAC sublayer 140 may also schedule information reporting, perform error correction through hybrid automatic repeat requests, prioritize handling between logical channels of a user equipment, prioritize handling between user equipment by means of dynamic scheduling, select transport format, and/or perform padding.

SDAP layer 110, also referred to as a New AS layer, is described in 3GPP TS 38.804 V.1.0.0. 3GPP TS 38.804 is hereby incorporated by reference. SDAP layer 110 is an upper layer located above the PDCP layer 120, and may help in mapping or remapping of the QoS flow to a data radio bearer. In addition, SDAP 110 may mark QoS flow data packets with a QoS flow identification, which may allow lower layers to identify to which QoS flow a given data packet belongs, as well as the peer entity to forward the packet. Both downlink and uplink data packets may be marked using the QoS flow identification. A QoS flow may be a managed data flow in which data packets being transmitted within the flow meet certain QoS performance, usability, and reliability criteria set by the manager of the QoS flow. For example, some QoS criteria specified for a given flow may be a bit rate, delivery order, priority, and/or delay characteristics. SDAP layer 110 may be used to manage the QoS flow.

In certain embodiments, the QoS flow may be remapped from a S-DRB to a T-DRB. In other words, the QoS performance, usability, and reliability criteria which were previously enforced at the S-DRB may be enforced at a new T-DRB, while the QoS criteria may no longer be enforced at the S-DRB. Data radio bearers may be links between a user equipment and a network entity in a network that are used to carry user plane content on an air interface between the user equipment and the network entity. The air interface, for example, may be located between the MAC layers of the user equipment and the network entity.

Each data radio bearer may have its own unique QoS characteristics. In some embodiments, the QoS flow managed by SDAP layer 110 may be mapped to a given data radio bearer. In such embodiments, the unique QoS characteristics of a given data radio bearer may be set by the QoS flow mapped to the data radio bearer. FIG. 1 illustrates a first radio bearer 150, represented as radio bearer x in FIG. 1, and a second radio bearer 160, represented as radio bearer y in FIG. 1, an may represent the number of data packet units in first radio bearer 150, while m may represent the number of data packet units in second radio bearer 160.

As can be seen in FIG. 1, an SDU may be transmitted from SDAP layer 110, to PDCP layer 120, to RLC layer 130, and eventually passed on to MAC layer 140 at the network node. The MAC layer at the network node may then transmit the PDU to the MAC layer of the user equipment, which may then forward the data packets to the RLC layer. The RLC layer may then transmit the data packets to upper layers, such as the PDCP layer and the SDAP layer. The upper layers may then transmit the data packets to any available internet protocol (IP) or non-internet protocol.

In certain embodiments, the timing of non-default data radio bearer establishment between the network and the user equipment for a QoS flow may not be done at the same time as a PDU session establishment. In addition, the first uplink packet that does not have a mapping to a data radio bearer may simply be mapped to a default data radio bearer.

In some embodiments, in which the user equipment does not undergo a handover, the QoS flow may be remapped to a new or a target data radio bearer at a frequent rate when the network does not intend to pre-establish data radio bearers for certain PDU sessions before the QoS flow appears. For example, a frequent rate may be that the QoS flow may be remapped at every, or almost every, new QoS flow setup event. A receiving AM RLC entity associated with the data radio bearer may handle the remapping, in certain embodiments, by buffering QoS flow data packets at the SDAP layer coming from T-DRB until an end marker (EM) associated with that QoS flow is received from S-DRB. On the transmitter side, on the other hand, the QoS flow packet may be buffered until the last packet delivered to the S-DRB has been acknowledged by the receiver upon which delivery to the T-DRB can begin.

The RLC entity in a UM mode, however, may be less reliable, given that the entity may not receive acknowledgements, employ error correction, and/or re-segmentation. As such, the delivery mechanism for the UM RLC entity may not be guaranteed, and the UM RLC entity by itself may not be able to properly begin receiving and/or transmitting data packets on the T-DRB. An SDAP layer entity may be used to help manage the QoS flow. The EM, which indicates to the receiving entity that no additional data packets are going to be sent from the sending entity may be lost, and the receiving entity may have no knowledge that additional data packets are not going to be sent from the transmitting entity. The SDAP layer entity, in certain embodiments, however, may therefore not be able to properly begin transmitting data packets on the T-DRB. Further, in some embodiments, the transmitting SDAP layer entity may not receive acknowledgments from the receiving entity, and therefore may not be able to receive an acknowledgement that the last data packet from the S-DRB was received, when the S-DRB may be associated with an UM RLC entity. In such embodiments, the SDAP layer entity may also not know when to begin transmitting data packets on the T-DRB.

In order to properly manage packets belonging to a given QoS flow after the remapping of the QoS flow from a S-DRB to a T-DRB, the SDAP layer entity may utilize a timer. The timer may be specific to the QoS flow. In other words, a QoS flow may have its own timer that depends on the unique QoS characteristics of the QoS flow. In some embodiments one or more QoS flows having similar characteristics may share a timer. In such embodiments, multiple QoS flows may be re-mapped with the same configuration message. The timer may belong to the SDAP layer. For example, the SDAP layer, which manages the QoS flow, may determine the duration of the timer. In other embodiments, the duration of the timer may be configured by the network and transmitted to the user equipment via radio resource control (RRC) signaling, Medium Access Control (MAC) signaling, and/or as SDAP layer Control PDU. In some embodiments, the timer may be kept within the SDAP layer.

The timer may be started when or after a receiver, such as a user equipment, receives an indication from a transmitter, such as a network entity, that the QoS flow should be relocated from a S-DRB to a T-DRB. The indication may be received via radio resource control (RRC) signaling, or any other signaling available to the network. In one example, the indication may be received at the user equipment by receiving the QoS flow packet via the T-DRB in a downlink message. An indication received as a downlink message may be referred to as a reflective QoS configuration. The duration of the timer may depend on the QoS characteristics, criteria, or rules of the QoS flow. In other embodiments, the duration of the timer may depend on the QoS characteristics of the S-DRB or the T-DRB. The duration of the timer may also depend on the technical capabilities of the user equipment. For example, the duration of the timer may depend on the buffering capabilities of the user equipment. The smaller the buffer capability of the user equipment, the shorter the duration of the timer may be.

In certain embodiments, during the duration of the timer the SDAP layer entity may allow QoS flow data packets received from the S-DRB to be processed and transmitted to higher layers. The QoS flow data packets received from the T-DRB during the duration of the timer, however, are stored in a buffer at the user equipment. The buffer may be located at the MAC, RLC, PDCP, or the SDAP layers. After the duration of the timer lapses or stops, the QoS flow data packets that have been stored in the buffer are processed and transmitted to higher layers. The data packets may be transmitted in the order in which they were received or according to their sequence numbers.

Meanwhile, in certain embodiments, after the duration of the timer lapses or stops, data packets received from the S-DRB may be discarded. The SDAP layer entity may either discard the data packets or trigger the discarding of the data packet. In some other embodiments, however, if no QoS flow packets are received from the T-DRB during the duration of the timer, resulting in an empty buffer, the SDAP layer may make an exception and keep accepting QoS flow data packets received from S-DRB, even after the duration of the timer has lapsed. Once the first QoS flow data packet is received from the T-DRB, however, the SDAP layer may stop accepting any data packets received from the S-DRB.

During QoS flow remapping, the transmitting entity may include a last sequence number associated with a last data packet of the QoS flow from the S-DRB. Based on this information, the receiving entity may release the QoS flow packets received from the T-DRB before the set duration of the timer. In other words, the user equipment may receive the last data packet having the last sequence number of the QoS flow from the S-DRB, and the timer may be stopped when or after receiving the sequence number of the last data packet. The user equipment may then proceed to transmit the buffered T-DRB once or after the timer has stopped, regardless of the original set duration of the timer. In some embodiments, even though the duration of the timer has yet to lapse or stop, the receiving entity may release the QoS flow packets received from the T-DRB to be forwarded to upper layers.

In some other embodiments, after receiving the sequence number beyond or higher than the sequence number associated with the last data packet, the user equipment may then proceed to transmit the buffered T-DRB data packets. The PDCP entity may reorder the received packets, and provides the received packets to the SDAP layer in the order of increasing sequence number. If a sequence number received may be higher than the sequence number associated with the last data packet, the receiving SDAP layer entity may, in some embodiments, therefore know that it can expect not to receive further packets from the S-DRB for the QoS flow.

In certain embodiments, the PDCP may know the QoS flow ID associated with a packet populated by the SDAP layer in the transmitting entity. The receiving PDCP entity may also inform the SDAP layer of the last sequence number of the received data packet when transmitting the data packet to the SDAP layer. In some embodiments, the user equipment may be informed of the last sequence number via RRC signaling when the QoS flow remapping is configured by the network. The user equipment may also include the uplink sequence number in the RRCReconfigurationComplete message or in a similar response message. By knowing the sequence number of the last data packet of the S-DRB, the user equipment may know when to begin to transmit and/or receive data using the T-DRB.

Figure 2:
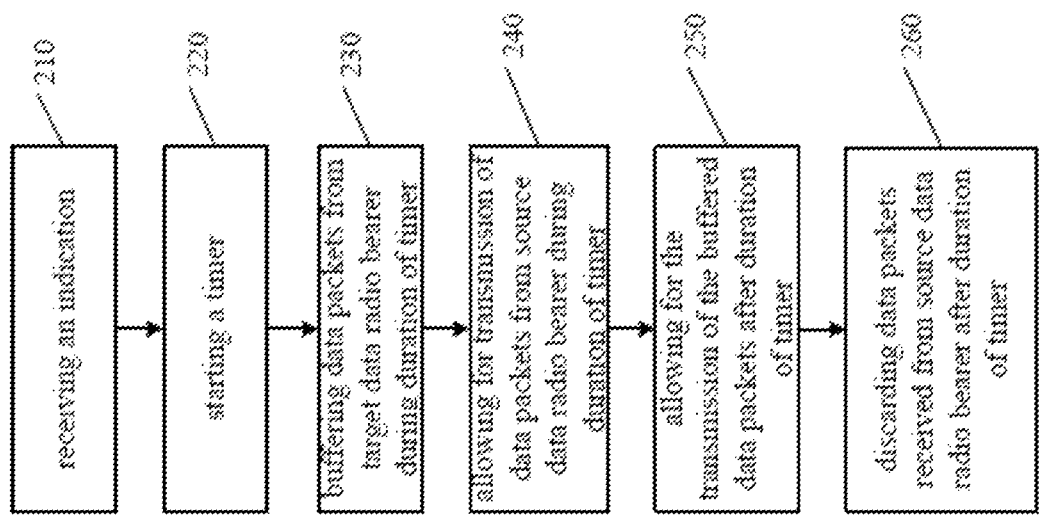
FIG. 2 illustrates an example of a method according to certain embodiments.

FIG. 2 illustrates an example of a method according to certain embodiments. In particular, FIG. 2 illustrates an example of a receiver according to certain embodiments. For example, the receiver may be a user equipment. In step 210, the receiver may receive an indication at a radio resource control entity or at a SDAP layer entity in a radio protocol from a transmitter. The transmitter, for example, may be a network entity. The indication may comprise instructions to relocate a QoS flow from a S-DRB to a T-DRB. The data radio bearers may be associated with a radio link control entity. The radio link control entity may be in an unacknowledged mode in the user plane. In step 220, a timer associated with the QoS flow may be started after the indication is received. The duration of the timer may be determined at the SDAP layer or received via an RRC entity, and may be determined based on QoS characteristics of the QoS flow, the S-DRB, the T-DRB, or based on network entity configuration.

In step 230, the data packets received as part of the QoS flow from the T-DRB during a duration of the timer may be buffered. The size of the buffer may be determined by the technical capabilities of the user equipment. Meanwhile, in step 240, data packets of the QoS flow received from the S-DRB during the duration of the timer may be allowed to be processed and/or transmitted to upper layers. In other words, the SDAP layer may allow for the processing and/or the transmission of the data packets to higher layers.

After the duration of the timer lapses or is stopped, the SDAP layer may allow the buffered data packets of the QoS flow received from the T-DRB to be transmitted to an upper layer in the radio protocol, as shown in step 250. In addition, data packets of the QoS flow received from the S-DRB after the duration of the timer has lapsed may be discarded, as shown in step 260. In some embodiments, however, data packets of the QoS flow received from the S-DRB after the duration of the timer has lapsed may be processed and/or transmitted to upper layers when no data packets of the QoS flow have been received from the T-DRB during the duration of the timer. The transmission may be stopped when a first one of the data packets of the QoS flow from the T-DRB is received.

In certain embodiments, a last data packet of the QoS flow from the S-DRB may be received, where the last data packet includes a last sequence number associated with the data packets of the QoS flow received from the S-DRB. Receiving the last data packet at the SDAP layer may trigger the stopping of the timer associated with the QoS flow when or after the last data packet is received.

Figure 3:
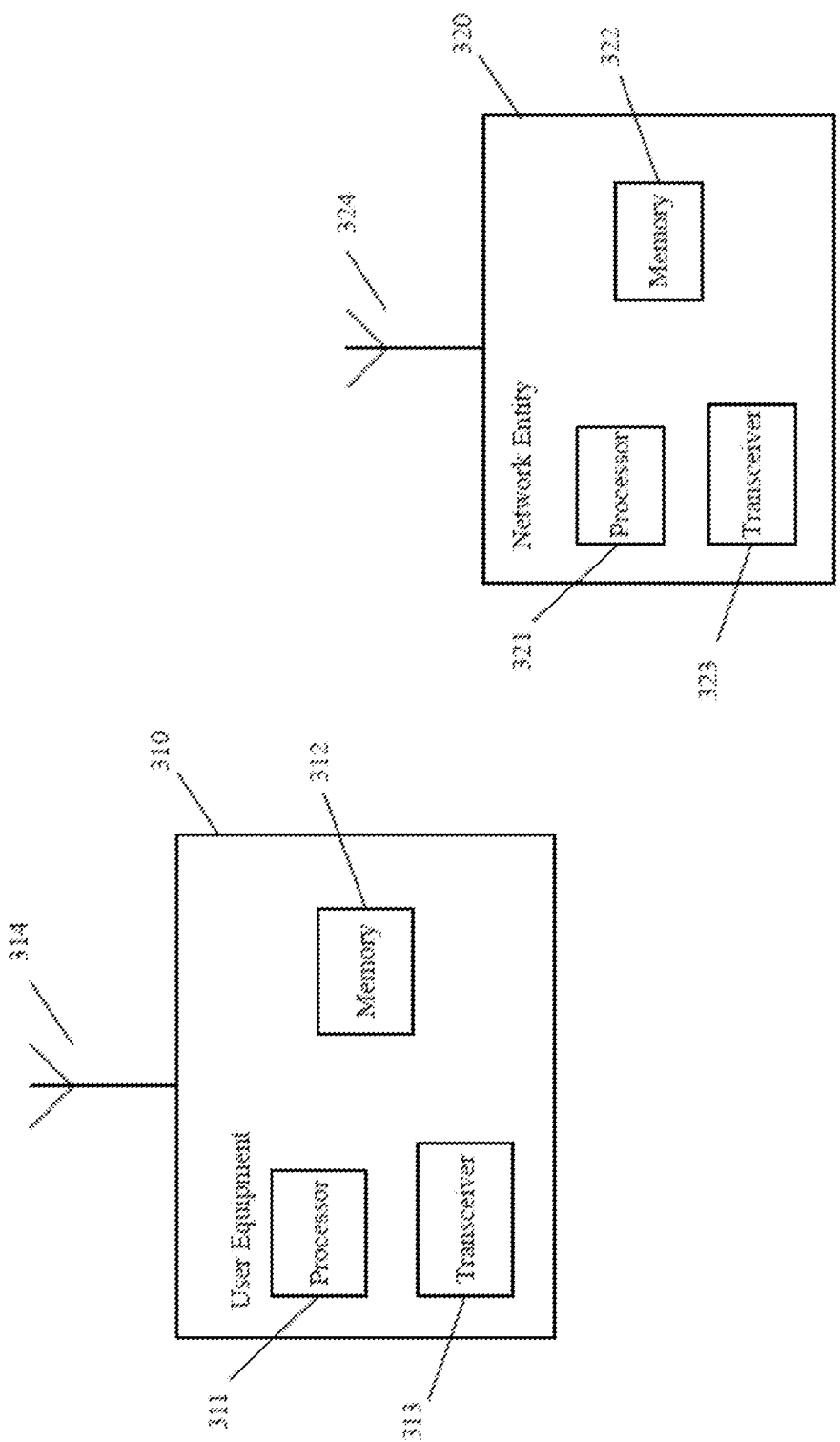
FIG. 3 illustrates an example of a system according to certain embodiments.

FIG. 3 illustrates a system according to certain embodiments. It should be understood that each signal or block in FIGS. 1 and 2 may be implemented by various means or their combinations, such as hardware, software, firmware, one or more processors and/or circuitry. In one embodiment, a system may include several devices, such as, for example, network entity 320 or user equipment (UE) 310. The system may include more than one UE 310 and more than one network entity 320. Network entity 320 may be a base station, a network node, an access point, an access node, a eNB, a server, a host, or any other network core entity that may communicate with the UE. The network entity may include the user plane radio protocol layers shown in FIG. 1. In certain embodiments, the network entity may be the transmitting entity or the transmitter sending the indication.

Each of these devices may include at least one processor or control unit or module, respectively indicated as 311 and 321. At least one memory may be provided in each device, and indicated as 312 and 322, respectively. The memory may include computer program instructions or computer code contained therein. One or more transceiver 313 and 323 may be provided, and each device may also include an antenna, respectively illustrated as 314 and 324. Although only one antenna each is shown, many antennas and multiple antenna elements may be provided to each of the devices. Other configurations of these devices, for example, may be provided. For example, network entity 320 and UE 310 may be additionally configured for wired communication, in addition to wireless communication, and in such a case antennas 314 and 324 may illustrate any form of communication hardware, without being limited to merely an antenna.

Transceivers 313 and 323 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or UE 310 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot. The user equipment may include the user plane radio protocol layers shown in FIG. 1. In certain embodiments, the UE may be the receiving entity or the receiver receiving the indication.

In some embodiments, an apparatus, such as a user equipment or a network entity, may include means for carrying out embodiments described above in relation to FIGS. 1 and 2. In certain embodiments, at least one memory including computer program code can be configured to, with the at least one processor, cause the apparatus at least to perform any of the processes described herein.

Processors 311 and 321 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 312 and 322 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 320 or UE 310, to perform any of the processes described above (see, for example, FIGS. 1 and 2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

In certain embodiments, an apparatus may include circuitry configured to perform any of the processes or functions illustrated in FIGS. 1 and 2. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Specific examples of circuitry may be content coding circuitry, content decoding circuitry, processing circuitry, image generation circuitry, data analysis circuitry, or discrete circuitry. The term circuitry may also be, for example, a baseband integrated circuit or processor integrated circuit for a mobile device, a network entity, or a similar integrated circuit in server, a cellular network device, or other computing or network device.

Furthermore, although FIG. 3 illustrates a system including a network entity 320 and UE 310, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. The UE 310 may likewise be provided with a variety of configurations for communication other than communicating with network node 320. For example, the UE 310 may be configured for device-to-device, machine-to-machine, or vehicle-to-vehicle communication.

The above embodiments provide for improvements to the functioning of a network and/or to the functioning of the network entities within the network, or the user equipment communicating with the network. For example, the above embodiments allow for less service interruption for a given QoS flow that remapped to a new data radio bearer. The embodiments can allow for packets with PDCP SN from the S-DRB to continue to be delivered to the receiver via the S-DRB until the timer lapses or is stopped, at which point the data packets from the T-DRB will be transmitted and/or received. Certain embodiments also allow for a UM RLC entity to preserve an orderly delivery to higher layers with minimal loss of packets of a given QoS flow when the QoS flow is remapped. This can avoid any issued related to potential end marker loss at the UM RLC entity.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to New Radio technology, the above embodiments may apply to any other 3GPP technology, such as IoT technology, LTE, LTE-advanced, fourth generation (4G) technology, and/or fifth generation (5G) technology.

PARTIAL GLOSSARY

3GPP Third Generation Partnership Project
LTE Long Term Evaluation
PDCP Packet Data Convergence Protocol
RLC Radio Link Control
MAC Medium Access Control
eNB enhanced NodeB
TM Transparent Mode
UM Unacknowledged Mode
AM Acknowledgement Mode
NR New Radio
AS Access Stratum
QoS Quality of Service
S-DRB Source Data Radio Bearer
T-DRB Target Data Radio Bearer
SDU Service Data Unit
PDU Packet Data Unit
TB Transport Blocks
EM End Marker
SDAP Service Data Adaptation Protocol

The invention claimed is:

1. A method comprising:
   receiving an indication at a radio resource control entity or service data adaptation protocol layer entity in a radio protocol of a receiver from a transmitter, wherein the indication comprises instructions to relocate a quality of service flow from a source data radio bearer to a target data radio bearer;
   starting a timer associated with the quality of service flow after receiving the indication;
   buffering data packets received as part of the quality of service flow from the target data radio bearer during a duration of the timer and delay processing of the data packets until after expiration of the timer, wherein the duration of the timer depends in part on quality of service characteristics of the source data radio bearer or the target data radio bearer, and on the capabilities of the receiver; and
   allowing for the transmission of the buffered data packets of the quality of service flow received from the target data radio bearer to an upper protocol layer after the duration of the timer has lapsed or stopped.

2. The method according to claim 1, wherein at least one of the source data radio bearer or the target data radio bearer is associated with a radio link control entity located at a user plane.

3. The method according to claim 1, wherein the radio link control entity is in an unacknowledged mode.

4. The method according to claim 1, further comprising:
   allowing for the transmission of data packets of the quality of service flow received from the source data radio bearer during the duration of the timer to the upper protocol layer.

5. The method according to claim 1, further comprising:
   discarding or triggering the discarding of data packets of the quality of service flow received from the source data radio bearer after the duration of the timer has lapsed.

6. The method according to claim 1, wherein the duration of the timer associated with the quality of service flow is determined by a service data adaptation protocol layer.

7. The method according to claim 1, further comprising:
   allowing for transmission of data packets of the quality of service flow received from the source data radio bearer after the duration of the timer has lapsed when no data packets of the quality of service flow have been received from the target data radio bearer during the duration of the timer, wherein the transmission is stopped when a first one of the data packets of the quality of service flow from the target data radio bearer is received.

8. The method according to claim 1, wherein the indication is received via radio resource control signaling.

9. The method according to claim 1, further comprising:
   receiving a last data packet of the quality of service flow from the source data radio bearer, wherein the last data packet comprises a last sequence number associated with the data packets of the quality of service flow received from the source data radio bearer; and
   stopping the timer associated with the quality of service flow when or after receiving the last data packet.

10. The method according to claim 1, wherein the receiver is a user equipment, and the transmitter is a network entity.

11. An apparatus comprising:
    at least one processor; and
    at least one memory and computer program code,
    wherein the at least one memory and the computer program code are configured to, with the at least one processor, cause the apparatus at least to:
    receive an indication at a radio resource control entity or service data adaptation protocol layer entity in a radio protocol of a receiver from a transmitter, wherein the indication comprises instructions to relocate a quality of service flow from a source data radio bearer to a target data radio bearer;
    start a timer associated with the quality of service flow after receiving the indication;
    buffer data packets received as part of the quality of service flow from the target data radio bearer during a duration of the timer and delay processing of the data packets until after expiration of the timer, wherein the duration of the timer depends in part on quality of service characteristics of the source data radio bearer or the target data radio bearer, and on the capabilities of the receiver; and allow for the transmission of the buffered data packets of the quality of service flow received from the target data radio bearer to an upper protocol layer after the duration of the timer has lapsed or stopped.

12. The apparatus according to claim 11, wherein at least one of the source data radio bearer or the target data radio bearer is associated with a radio link control entity located at a user plane.

13. The apparatus according to claim 11, wherein the radio link control entity is in an unacknowledged mode.

14. The apparatus according to claim 11, wherein the at least one memory and the computer program code are also configured to, with the at least one processor, cause the apparatus at least to:

allow for the transmission of data packets of the quality of service flow received from the source data radio bearer during the duration of the timer to the upper protocol layer.

15. The apparatus according to claim 11, wherein the at least one memory and the computer program code are also configured to, with the at least one processor, cause the apparatus at least to:

discard or trigger the discarding data packets of the quality of service flow received from the source data radio bearer after the duration of the timer has lapsed.

16. The apparatus according to claim 11, wherein the duration of the timer associated with the quality of service flow is determined by a service data adaptation protocol layer.

17. The apparatus according to claim 11, wherein the at least one memory and the computer program code are also configured to, with the at least one processor, cause the apparatus at least to:

allow for transmission of data packets of the quality of service flow received from the source data radio bearer after the duration of the timer has lapsed when no data packets of the quality of service flow have been received from the target data radio bearer during the duration of the timer, wherein the transmission is stopped when a first one of the data packets of the quality of service flow from the target data radio bearer is received.

18. The apparatus according to claim 11, wherein the at least one memory and the computer program code are also configured to, with the at least one processor, cause the apparatus at least to:

receive a last data packet of the quality of service flow from the source data radio bearer, wherein the last data packet comprises a last sequence number associated with the data packets of the quality of service flow received from the source data radio bearer; and stop the timer associated with the quality of service flow when or after receiving the last data packet.

\* \* \* \* \*